June 30, 1953  A. L. BAKER  2,643,845
ADJUSTABLE LEVELING SCREW
Filed July 28, 1947
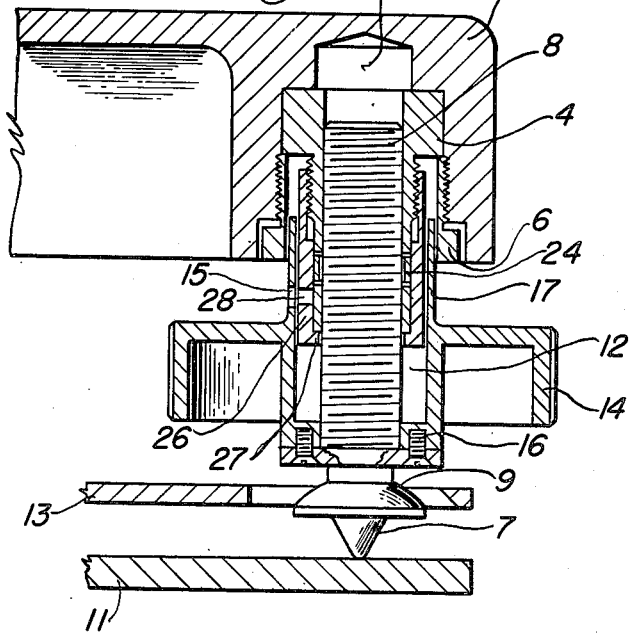
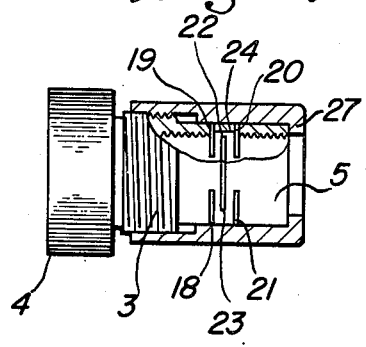
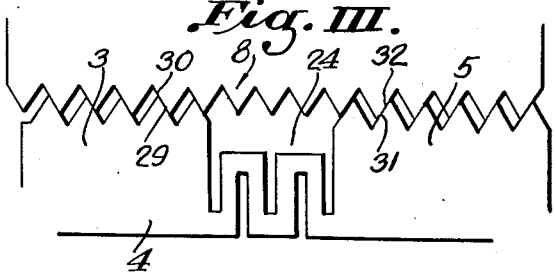
INVENTOR.
ALLISTER L. BAKER Patented June 30, 1953

2,643,845

UNITED STATES PATENT OFFICE 2,643,845

ADJUSTABLE LEVELING SCREW

Allister L. Baker, Jersey City, N. J., assignor to Keuffel & Esser Company, Hoboken, N. J., a corporation of New Jersey Application July 28, 1947, Serial No. 764,106

5 Claims. (Cl. 248—180)

1

In a surveying instrument, it is customary to provide three or four screws for levelling the instrument. In the case where only three screws are provided, if wear has caused any play in the threads, the instrument will rock to the extent of that wear.

Accordingly in a surveying instrument provided with only three levelling screws, it is particularly important to provide a structure for taking up this wear. It is the purpose of this invention to provide an improved arrangement for compensating such wear in a screw thread and in its engaging thread.

Another object of the invention is to provide a levelling screw having enclosed threads to protect them from grit, etc. which cause excessive wear. These and other objects of the invention and the manner of achieving them will become more apparent from the following description taken in connection with the accompanying drawing in which:

Fig. I is a view in vertical section through a levelling arm and one levelling screw of a surveying instrument, showing means for compensating wear in the threads.

Fig. II is a view in elevation partly in section showing only the female threaded member 4 of Fig. I. The figure has been rotated 90° in the plane of the paper.

Fig. III is a view in enlarged diagrammatic vertical section showing the manner in which the threads of the male and female threaded members engage. This figure has also been rotated 90° in the plane of the figure.

Referring to Fig. I, one arm 2, of the levelling head of the surveying instrument is shown. The arrangement of the parts making up the screw will be the same whether three or four screws are used. The female threaded member 4 fits into a socket recess in the arm 2 of the levelling head and is held in place therein by the threaded sleeve 6. The sleeve 6 is provided with an external thread which engages a thread on the inside surface of the recess in the arm 2. The upper end of the sleeve 6 is provided with a flat surface acting on the lower surface of a flange provided on the female threaded member 4, to hold it firmly and rigidly in the socket recess provided in the arm 2.

The male threaded member 8 engages the female threaded member 4. The necessary vertical motion for levelling is provided by the male threaded member 8 moving in the female threaded member 4 within the limits allowed by the spaces 10 and 12 and the length of the male threaded member 8.

The male threaded member 8 is provided with a pointed end 7 which is shown resting on the base member 11 which may be attached to a tripod. A flat spring member 13 provided with an aperture fits over the top of the circular flange 9 and holds the levelling screw down firmly by means of two beveled surfaces out of the plane of the section. The knurled knob 14, is fastened to the male threaded member 8 as by the screws 16 for ease of turning when levelling. The knurled knob 14 is provided with a vertical sleeve 17, which may extend up into the threaded sleeve 6 to enclose the threads in order to keep out grit, etc.

The female threaded member 4 is shown per se in Fig. II, in a position rotated 90° in the plane of the paper. It is provided with a plurality of slots which may be the six slots 18, 19, 20, 21, 22 and 23 as shown. Slot 22 is directly under slot 23 and is cut into the member from the opposite side. In the region of these slots the internal threads of the female threaded member 4 are cleared away as shown at 24. The female threaded member 4 therefore has two longitudinally spaced threaded portions which can be moved with respect to each other. This may be accomplished by compressing the female threaded member in the region 24 where it now has a compression or tension spring arrangement.

In Figs. I and II a compressing member 26 is shown in position enclosing the lower part of the female threaded member 4. The compressing member 26 engages threads on the outside of the female threaded member 4 beyond the region 24 and is provided with a flange 27 which acts against the bottom of the female threaded member 4 to compress it. The compressing member 26 is provided with a hole 28 for receiving an adjusting pin.

The knurled knob 14 is provided with a vertical sleeve 17 extending upward and enclosing the compressing member 26. The compressing member 26 which may be considered a part of the female threaded member 4 provides an external smooth cylindrical surface extending below the arm 2. The fit between the vertical sleeve 17 extending from the knurled knob 14 and this external smooth cylindrical surface of the compressing member 26 is tight enough to impede or to prevent the entrance of dirt, etc. to the space 12 where it could become caught in the threads of the male and female threaded members 8 and 4 and increase the rate of wear of the threads.

The vertical sleeve 17 of the knurled knob 14 is also provided with a hole 15. The holes 15 and 28 may be lined up by turning the knurled knob 14. An adjusting pin may then be passed through the hole 15 to engage the hole 28 and the compressing member 26 and as well as the knurled knob 14 and the male threaded member 8 may be turned together thereby to compress the female threaded member 4. For ease of adjustment a series of holes may be provided in the compressing member 26, any one of which will receive adjusting pin when lined up with the hole 15.

To compensate for wear in the threads of the female threaded member 4 or the male threaded member 8, the female threaded member may be expanded or compressed as described by turning the compressing member 26 with an adjusting pin. When the female threaded member is compressed in the region of the slots 18, 19, 20, 21, 22 and 23, as is shown diagrammatically in Fig. III, the surface 29 of a thread of the portion 3 of the female threaded member 4 is forced against the surface 30 of a thread of the male threaded member 8 and the surface 31 of a thread of the portion 5 of the female threaded member 4 is forced against the surface 32 of a thread of the male threaded member 8. Likewise all the thread surfaces, facing right in the diagram of the portion 3 of the female threaded member 4 are forced against thread surfaces facing left of the male threaded member 8 and all the thread surfaces facing left of the portion 5 of the female threaded member 4 are forced against thread surfaces facing right of the male threaded member 8. Thus the threads of the male and female threaded members are again held in fixed relative position and the effect of wear has been fully compensated.

What is claimed is:

1. The combination of two threaded members engaging each other for holding and levelling an instrument over a base member, one of said threaded members being secured to the instrument and the other of said members being secured to the base member, one of said threaded members having two threaded portions engaging the other threaded member, and a third member threadably engaging one of said threaded portions and also engaging the other of said threaded portions for moving said threaded portions relative to each other so that opposite sides of the threads, in the axial direction, on the two threaded portions come in contact with the threads of the other threaded member to compensate for play in the engaging threads of the two threaded members.

2. In a device for levelling an instrument over a base, the combination of a male and female threaded member engaging each other, one of said threaded members being secured to the instrument and the other of said threaded members being secured to the base, said female threaded member having two threaded portions engaging the male threaded member, and a sleeve having threads engaging threads provided on the outside of one threaded portion of said female threaded member and also engaging the other threaded portion of said female threaded member for moving said threaded portions relative to each other so that opposite sides of the threads, in the axial direction, on the two threaded portions come in contact with the threads of the other threaded member to compensate for play in the engaging threads of said male and female threaded members.

3. In a device for levelling an instrument over a base by moving an arm of the instrument, the combination of a female threaded member secured to the arm and extending toward the base, a male threaded member engaging said female threaded member and pivotally mounted to the base, means for turning said male threaded member to move the arm of the instrument, said female threaded member having two threaded portions engaging said male threaded member and a sleeve having threads engaging threads provided on the outside of one threaded portion of said female threaded member and also engaging the other threaded portion of said female threaded member for moving said threaded portions relative to each other so that opposite sides of the threads in the axial direction on the two threaded portions come in contact with the threads of the other threaded member to compensate for play in the engaging threads of said male and female threaded members.

4. In a device for levelling an instrument over a base by moving an arm of the instrument, the combination of a female threaded member secured within a recess provided in the arm and extending toward the base, a male threaded member engaging said female threaded member and pivotally mounted to the base, means for turning said male threaded member to move the arm of the instrument, said female threaded member having two threaded portions engaging said male threaded member, means for adjustably moving said threaded portions relative to each other and for holding said threaded portions in adjusted position so that opposite sides of the threads in the axial direction on the two threaded portions come in contact with the threads of the other threaded member to compensate for play in the engaging threads of said male and female threaded member and a sleeve carried by said male threaded member enclosing said female threaded member and fitting within the recess provided in the arm, said sleeve fitting the adjacent parts sufficiently close to exclude foreign matter from the engaging threads of said male and female threaded members.

5. In a device for levelling an instrument over a base by moving an arm of the instrument, the combination of a female threaded member having an external cylindrical surface within a recess provided in the arm and extending toward the base and provided with an external cylindrical surface smaller than the internal cylindrical surface of said recess nearer the base, means removably holding said female threaded member in said recess, a male threaded member engaging said female threaded member and pivotally mounted to the base, means for turning said male threaded member to move the arm of the instrument, and a sleeve carried by said male threaded member enclosing said female threaded member and fitting within the recess provided in the arm between the external cylindrical surface provided on said female threaded member and the internal cylindrical surface provided in said recess, said sleeve fitting the adjacent parts sufficiently close to exclude foreign matter from the engaging threads of said male and female threaded members.

ALLISTER L. BAKER.

References Cited in the file of this patent

UNITED STATES PATENTS

| Number | Name | Date |
|---|---|---|
| 1,500,901 | Sevigne | July 8, 1924 |
| 2,035,055 | Dyer | Mar. 24, 1936 |
| 2,248,209 | Vacquier | July 8, 1941 |
| 2,285,080 | Berge | June 2, 1942 |
| 2,367,259 | Beach | Jan. 16, 1945 |
| 2,370,223 | Beuer | Feb. 27, 1945 |
| 2,424,242 | Krause | July 28, 1947 |
| 2,438,479 | Patrosio | Mar. 23, 1948 |
| 2,440,211 | Rothweiler | Apr. 20, 1948 |